(No Model.)

A. STRAUS.
PROCESS OF MANUFACTURING PNEUMATIC TIRES.

No. 548,673. Patented Oct. 29, 1895.

Witnesses:
Raphaël Netter
James R. Catlow

Inventor
Alexander Straus
by Duncan & Page
Att'ys

UNITED STATES PATENT OFFICE.

ALEXANDER STRAUS, OF NEW YORK, N. Y.

PROCESS OF MANUFACTURING PNEUMATIC TIRES.

SPECIFICATION forming part of Letters Patent No. 548,673, dated October 29, 1895.

Application filed April 4, 1895. Serial No. 544,387. (No model.)

*To all whom it may concern:*

Be it known that I, ALEXANDER STRAUS, a citizen of the United States, residing at New York, in the county and State of New York, have invented certain new and useful Improvements in Processes of Manufacturing Pneumatic Tires, of which the following is a specification, reference being had to the drawings accompanying and forming a part of the same.

I have discovered a new and valuable method or process of manufacturing pneumatic tires for cycles and other vehicles, which I shall first describe in detail, and then point out by the claims the features which I regard as novel and of my invention.

I first apply to or spread over a drum of the proper circumference for the tires a sheet of rubber in an uncured condition, of suitable thickness and quality to form the outer layer or coating for sheath of tire. This sheet may be of a width to form one or several tire-sheaths; but as it is more practicable to make several tires at one operation the process for so doing will be described. Over this sheet of rubber I next lay and then roll or pass a sheet of canvas or any specially-woven fabric, such as is ordinarily used to give the necessary strength to the tires and coat the same with rubber solution. I next lay around the drum and over the solutioned fabric partially cured or vulcanized rubber air-tubes in flattened condition and at proper distances apart and join or splice their ends either before or after their application to the drum. I then subject the whole to a curing or vulcanizing process, which partially cures or vulcanizes the rubber sheet and nearly though not fully cures the previously partially-cured air-tubes. This may be effected in any well-known manner, as by wrapping around the materials on the drum a cloth and placing the drum with the rubber sheet, the fabric, and the tubes in a vulcanizing-oven. After this step has been carried out the cloth covering is removed and the rubber sheet and layer of fabric, which have now become firmly adherent, are cut in circumferential lines between the tubes, which have also become firmly adherent to the fabric. The edges of the separate strips are then folded over their respective rubber tubes and butt-joints formed, which are reinforced by strips of canvas coated with solution and along and over the abutting edges, either inside or outside the sheath, or both. The whole is then subjected to the curing or vulcanizing process until all the component rubber parts are fully cured. The tire is then in condition for use.

Figure 1:
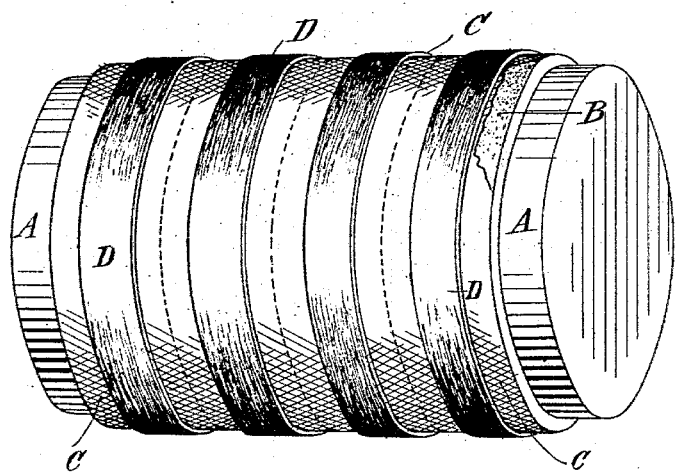
Figure 2:
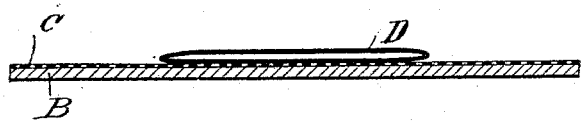
Figure 3:
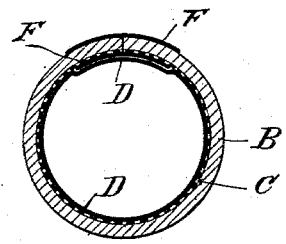

In the drawings, Figure 1 represents in perspective the drum above described with the component parts of a number of tires applied thereto. Fig. 2 represents in section one of the strips of rubber and fabric composing the sheath with its adherent air-tube, and Fig. 3 shows in section the completed tire.

A is the drum.

B is the rubber sheet, C the layer of fabric, and D the rubber air-tubes.

The dotted lines E indicate the lines along which the rubber and fabric are cut.

In the complete tire F F are the strips of canvas or fabric that reinforce the butt-joint between the longitudinal edges of the sheath or adherent layers of rubber and fabric.

If the air-tubes after being formed are partially cured before being applied to the fabric on the drum, their inner surfaces which are brought in contact by the flattening of the tubes do not become adherent to one another in the subsequent steps of the process, although the exterior surfaces in contact with the solution-coated fabric become firmly adherent thereto, as the gases or vapor which are driven off from the solution under the air-tubes by the action of heat-escape at the edges of the flattened tubes and do not impair in any manner the close union of the rubber and the fabric. Thus is obviated the main difficulty met with in vulcanizing together the component parts of complete tubes, in which no adequate provision is made for the escape of these vapors from the solution so that they form blisters and prevent the adhesion of the rubber and fabric.

The degree of vulcanization to which the air-tubes are to be subjected before application to the drum may vary, and in fact that may be applied to an uncured state, although in that case soapstone must be introduced into their interior or other like provision made for preventing their inner walls from becoming adherent by subsequent vulcanization.

The final steps of folding over the edges of the sheath and uniting the same, as above described, constitute a process which I have already described and claimed in my Patent No. 533,251, dated January 29, 1895. The novel features or steps of the process as a whole are those described above as consisting in the application of the tubes, particularly in a semi-vulcanized state, to the drum and the other steps preliminary to the vulcanization of the sheath and tubes either before or after the division of the former.

It will be understood that the usual valve-tubes may be inserted or applied to the air-tubes at any proper time and in any of the ways usually followed in the manufacture of similar tires.

What I claim is—

1. The improvement in processes of manufacturing pneumatic tires which consists in forming a flat compound strip of rubber and fabric, cementing to the fabric surface of said strip a rubber tube in a flattened condition, subjecting the strip and attached tube to vulcanization and then folding the edges of the strip around the tube and uniting them to form the sheath, as set forth.

2. The process of manufacturing pneumatic tires which consists in applying to a drum a sheet of uncured rubber, laying over this a layer or sheet of fabric to form the sheath, encircling the sheath with an air tube which has not been fully vulcanized or cured and joining the ends of the same, subjecting the whole to the vulcanizing or curing process, and then folding over and uniting the edges of the sheath to inclose the air tube, as set forth.

3. The process of manufacturing pneumatic tires which consists in applying to a drum a sheet of uncured rubber, laying over this a sheet of fabric, encircling the fabric with two or more air tubes in a partially cured state, vulcanizing the whole, then dividing the compound sheet of rubber and fabric between the air tubes to form the sheaths, and then folding over and uniting the edges of the sheaths to inclose their respective air tubes, as set forth.

4. The process of manufacturing pneumatic tires which consists in applying to a circular drum a sheet of uncured rubber and over the same a layer of fabric, wrapping around the drum over the fabric and cementing thereto a partially cured air tube and joining or splicing the ends of the same, then partially vulcanizing the whole, then folding over the edges of the sheath joining and reinforcing the same with strips of fabric, and then completing the vulcanization of the tire thus formed, as set forth.

In testimony whereof I have hereunto set my hand this 30th day of March, 1895.

ALEXANDER STRAUS.

Witnesses:
ROBT. F. GAYLORD,
JAMES N. CATLOW.